(12) United States Patent
Baumann et al.

(10) Patent No.: US 7,331,332 B2
(45) Date of Patent: Feb. 19, 2008

(54) METHOD FOR OPERATING AN INTERNAL COMBUSTION ENGINE

(75) Inventors: Andreas Baumann, Farmington Hills, MI (US); Frank Ottusch, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/646,922

(22) Filed: Dec. 27, 2006

(65) Prior Publication Data

US 2007/0175439 A1 Aug. 2, 2007

(30) Foreign Application Priority Data

Dec. 27, 2005 (DE) ...................... 10 2005 062 552

(51) Int. Cl.
*F02D 7/02* (2006.01)
*F02D 7/00* (2006.01)
(52) U.S. Cl. .................................. 123/481; 123/198 F
(58) Field of Classification Search ................ 123/481, 123/198 F, 325, 326, 472, 478, 299
See application file for complete search history.

(56) References Cited

U.S. PATENT DOCUMENTS

| | | | | |
|---|---|---|---|---|
| 4,107,921 | A | * | 8/1978 | Iizuka .......................... 60/288 |
| 4,535,744 | A | * | 8/1985 | Matsumura .................. 123/493 |
| 5,099,816 | A | * | 3/1992 | Ohga et al. .................. 123/481 |
| 5,727,527 | A | * | 3/1998 | Mueller et al. .............. 123/481 |
| 6,619,267 | B1 | * | 9/2003 | Pao ............................. 123/481 |
| 6,874,463 | B1 | * | 4/2005 | Bolander et al. ......... 123/198 F |
| 6,907,871 | B2 | * | 6/2005 | Fukusako et al. ........... 123/594 |
| 2003/0172900 | A1 | * | 9/2003 | Boyer et al. ............. 123/198 F |
| 2004/0237935 | A1 | * | 12/2004 | Fukusako et al. ....... 123/406.47 |

\* cited by examiner

*Primary Examiner*—Mahmoud Gimie
(74) *Attorney, Agent, or Firm*—Kenyon & Kenyon LLP

(57) ABSTRACT

An internal combustion engine includes multiple combustion chambers. The supply of fuel into at least one subset of the combustion chambers can temporarily be interrupted. It is provided that the fuel be injected into the combustion chambers directly and during a switchover phase for interrupting or resuming fuel injection into the subset of combustion chambers, at least temporarily via multiple injections.

10 Claims, 3 Drawing Sheets

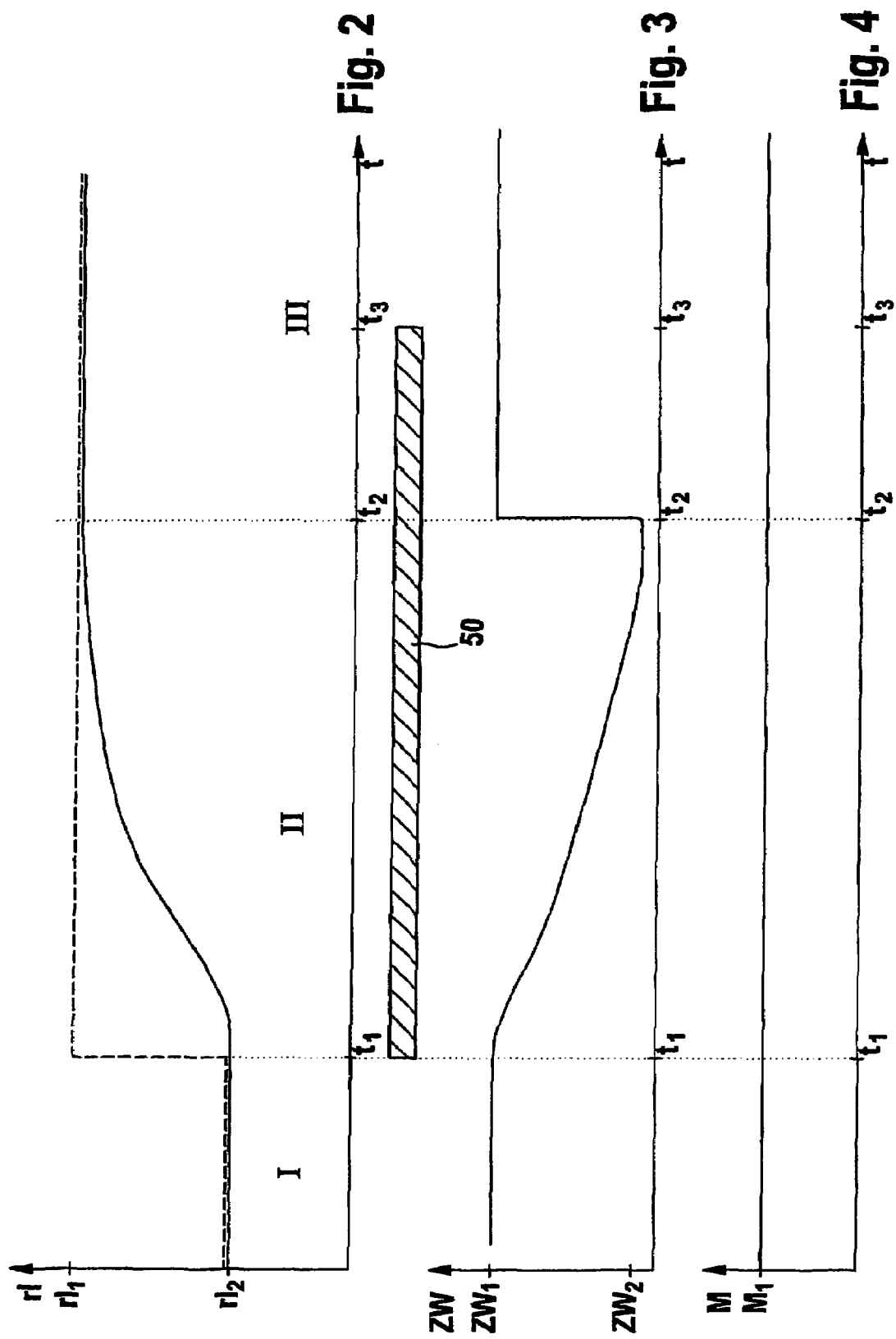

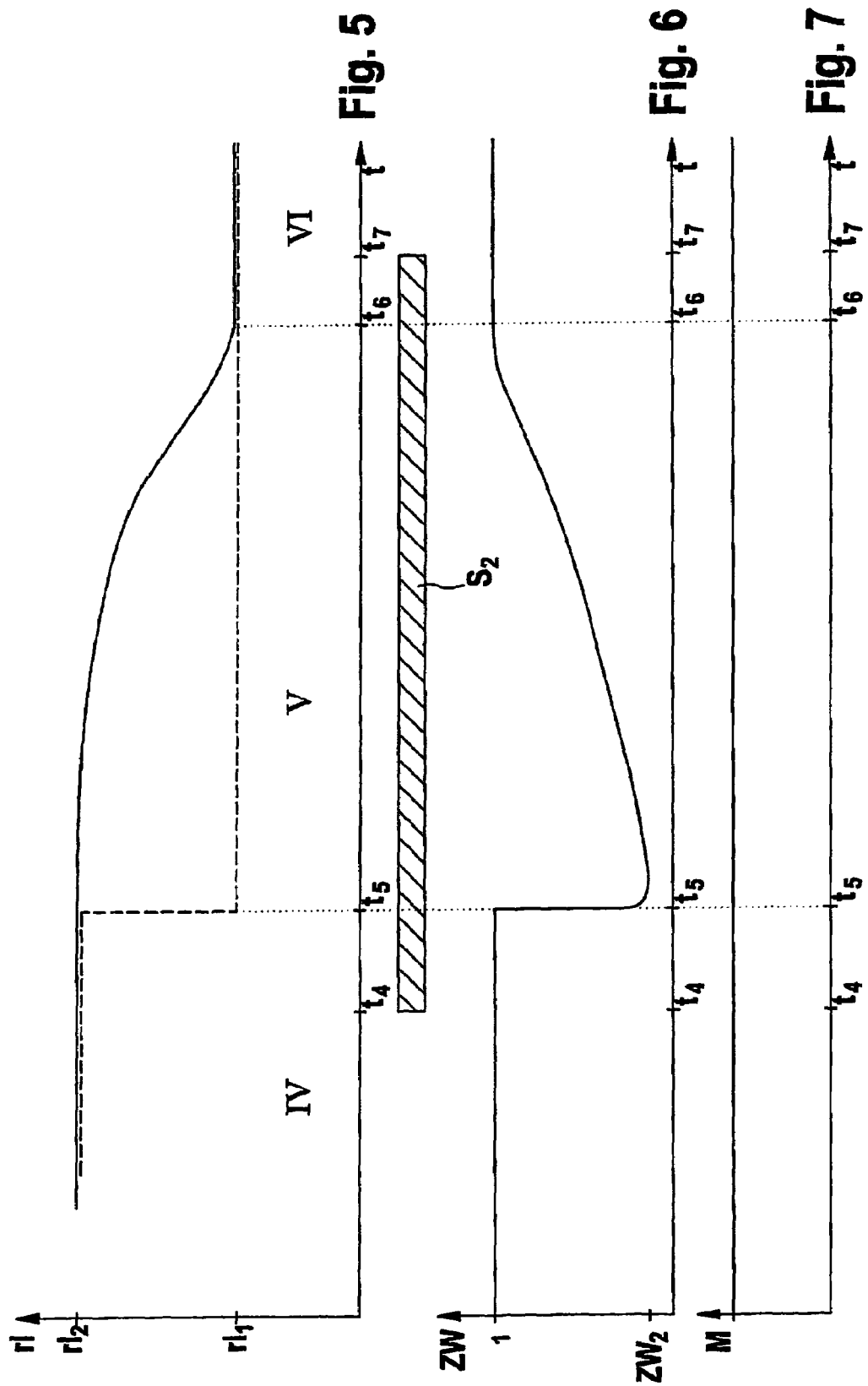

METHOD FOR OPERATING AN INTERNAL COMBUSTION ENGINE

BACKGROUND INFORMATION

The concept known from the market as "half-engine operation" is used in internal combustion engines having intake manifold injection. In this concept, the injection of fuel into certain cylinders in an internal combustion engine is interrupted in certain operating states for the purpose of reducing the fuel consumption. For example, in an eight-cylinder engine, half of the cylinders are shut off in this way. In order to prevent torque fluctuations or even torque jumps from occurring when the fuel injection into (and thus the combustion in) a subset of combustion chambers is interrupted and when injection is resumed, the air charge in the combustion chambers is increased prior to an interruption and the ignition angle is retarded in such a way that the torque remains the same overall.

If a subset of combustion chambers is shut off by interrupting the injection, the ignition angle is suddenly advanced at the time of shut-off. In this way, the combustion chambers into which fuel continues to be injected are able to immediately compensate for the dropping power of the shut off combustion chambers. This would not be possible by simply increasing the air filling at the time of shut-off due to the inertia of the filling path. The operation is reversed when injection into the subset of combustion chambers in question is resumed after a previous interruption.

Furthermore, the principle of overrun shut-off is also known in which not only a subset of the combustion chambers but all combustion chambers are temporarily shut off in the overrun mode.

An object of the present invention is to provide a method mentioned at the outset in which the operating range of the internal combustion engine in which the fuel supply to at least one subset of the combustion chambers may be temporarily interrupted is extended with low emissions at the same time.

SUMMARY OF THE INVENTION

It is possible in the case of direct fuel injection to divide the introduction of fuel into a combustion chamber into multiple individual injections or injection quantities per combustion cycle. If this is implemented during a switchover phase during which injection of fuel into at least one subset of combustion chambers is interrupted or resumed after an interruption, the stability of combustion is ensured even if the ignition angle is retarded to a high degree. The operating range in which the fuel supply into a subset of the combustion chambers may be temporarily interrupted is considerably extended. Moreover, the fuel mass introduced into the combustion chambers, i.e., a wall film on a cold combustion chamber wall, is reduced by such multiple injections. This results in an emission reduction during operation of the internal combustion engine. This is particularly favorable when all combustion chambers are temporarily shut off within the scope of an overrun shut-off.

It should be noted at this point that multiple injections may include two separate injections, but triple or quadruple injections are also possible during a combustion cycle when special injectors are used, e.g., injectors having piezoelectric actuators. Performing multiple injections only from time to time, namely when there is a switchover phase for interrupting or resuming the injection, has in turn the advantage that the injector and the output stage activating the injector are relieved. It should also be noted at this point that the achieved advantages are the greatest when the multiple injections are carried out in all the combustion chambers present.

It is particularly advantageous when, during multiple injections, at least one injection takes place during an intake stroke and another injection takes place during a compression stroke of the same combustion cycle, thereby clearly stabilizing the combustion behavior, and the fuel mass introduced into a wall film of the combustion chamber is definitely reduced in this way.

Furthermore, it is provided that an air charge be increased prior to the switchover for an interruption of the fuel injection into a subset of combustion chambers and an ignition angle be retarded and that a switchover is made from single injection to multiple injections at the start or during the increase of the air charge and the adjustment of the ignition angle. According to the present invention, multiple injections are used only shortly before the switchover for an interruption of the fuel supply into the subset of combustion chambers. This makes it possible to avoid unnecessary multiple injections and the injector and an output stage activating the injector are prevented from suffering damage. Moreover, using multiple injections according to the present invention ensures combustion even when the internal combustion engine is operated with a retarded ignition angle, which improves the quality of the switchover processes by reducing combustion misfires, for example.

According to a specific refinement, multiple injections are terminated directly during or after the switchover. Since the ignition angle, previously retarded is displaced back into the optimum ignition angle range directly with the switchover, thereby terminating the switchover, the multiple injection is no longer needed. Due to its quick termination, overloading of the output stage and the injector is avoided.

That refinement of the method according to the present invention aims at the same objective, in which only at the time of or immediately prior to switchover for a resumption of fuel injection into the subset of combustion chambers a switchover is made from a single injection to multiple injections. In this way also, an unnecessarily long and, for the quality of the switchover irrelevant, operation with multiple injections is avoided. The method also aims at the same objective in which an air charge is dropped and retarding of the ignition angle is reversed after the switchover for a resumption of fuel injection into the subset of combustion chambers and in which a switchover is made from multiple injections to a single injection at least approximately at the and of the reduction and cancellation of the "retard" position.

It is particularly advantageous when a crankshaft angle of the switchover from a single injection to multiple injections is at least indirectly the function of an instantaneous operating state of the internal combustion engine, in particular an instantaneous load. This allows the emission behavior during switchover and the quality of the switchover process to be improved and the load on the injector and the output stage to be reduced at the same time.

BRIEF DESCRIPTION OF THE DRAWINGS

FIG. 2 shows a diagram in which an air charge and a phase with multiple injections are plotted against time for the case of an interruption of the fuel injection into the first subset of combustion chambers of FIG. 1.

FIG. 3 shows a diagram in which an ignition angle is plotted against time during the shut-off of the first subset of combustion chambers.

FIG. 4 shows a diagram in which a torque is plotted against time for the case in which the first subset of combustion chambers is shut off.

FIG. 5 shows a diagram similar to FIG. 2 for the case in which the fuel injection into the first subset of combustion chambers is resumed.

FIG. 6 shows a diagram similar to FIG. 3 for the case in which the fuel injection into the first subset of combustion chambers is resumed.

FIG. 7 shows a diagram similar to FIG. 4 for the case in which the fuel injection into the first subset of combustion chambers is resumed.

DETAILED DESCRIPTION

Figure 1:
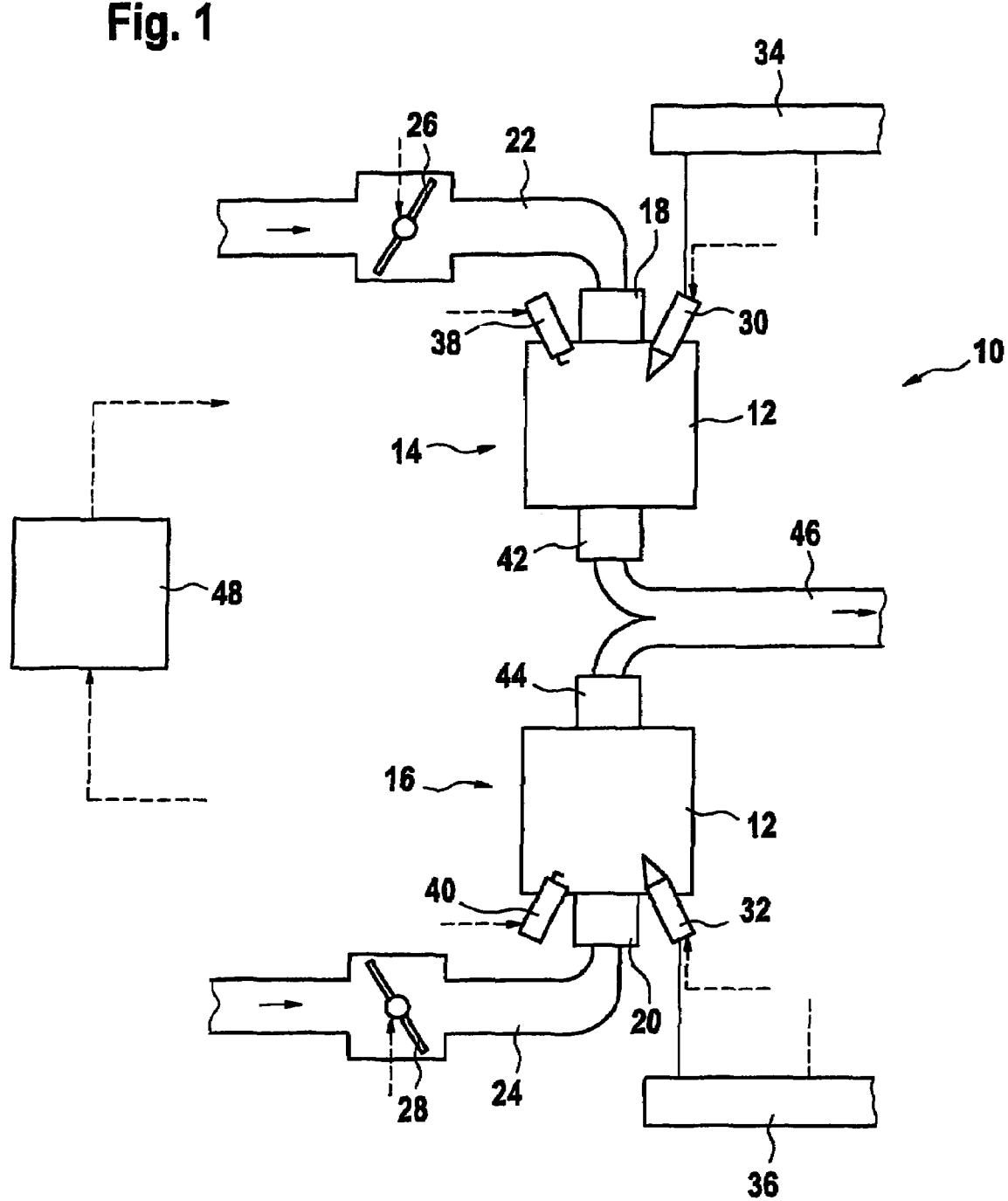
FIG. 1 shows a schematic representation of an internal combustion engine having a first subset of combustion chambers and a second subset of combustion chambers.

An internal combustion engine is indicated by reference numeral 10 in FIG. 1. It is used for driving a motor vehicle (not shown in FIG. 1). Internal combustion engine 10 includes a plurality of cylinders having combustion chambers 12, only two of which are shown in FIG. 1 for the sake of simplicity. Combustion chambers 12 are composed of a first subset 14 of combustion chambers 12 and a second subset 16 of combustion chambers 12. Under the assumption of, for example, a total of eight combustion chambers 12 or cylinders, first subset 14 could include four combustion chambers 12 and second subset 16 could also include four combustion chambers 12.

Combustion air reaches combustion chambers 12 via intake valves 18 and 20 and intake manifolds 22 and 24. Throttle valves 26 and 28 are situated in each intake manifold 22 and 24 belonging to a subset 14 and 16. Fuel reaches combustion chambers 12 directly via injectors 30 and 32. A fuel pressure accumulator 34 and 36, referred to as "rail," is assigned to each subset 14 and 16 of combustion chambers 12, to which respective injectors 30 and 32 are connected. A fuel/air mixture in combustion chambers 12 is ignited by appropriate spark plugs 38 and 40 and the hot combustion exhaust gases are discharged into an exhaust pipe 46 via outlet valves 42 and 44.

The operation of internal combustion engine 10 is controlled and/or regulated by a control and regulating unit 48. This unit receives signals from different sensors, e.g., an accelerator pedal of a motor vehicle, via which a user is able to express a torque intent, and temperature, pressure, and other sensors which detect the instantaneous operating state of internal combustion engine 10. In order to keep the fuel consumption during operation of internal combustion engine 10 as low as possible, first subset 14 of combustion chambers 12 may be shut off, if no overly high performance is demanded from internal combustion engine 10, by interrupting the injection of fuel by injector 30. In this case, the torque of internal combustion engine 10 is generated only by the remaining second subset 16 of combustion chambers 12 whose injector 32 continues to inject fuel directly. If a higher performance is demanded from internal combustion engine 10, then the fuel injection by injector 30 into combustion chambers 12 of first subset 14 is resumed. If fuel is injected into all combustion chambers 12 of first subset 14 and second subset 16, this is referred to as "full-engine operation"; if, however, the fuel supply into first subset 14 of combustion chambers 12 is interrupted, this is referred to as "half-engine operation."

A method for interrupting and resuming the fuel injection into first subset 14 of combustion chambers 12 is explained in detail in the following with reference to FIGS. 2 through 7. The method is stored in a memory of control and regulating unit 48 in the form of a computer program.

The switchover phase, during which the fuel injection into first subset 14 of combustion chambers 12 is interrupted, can be subdivided into three sections I, II, and III: all combustion chambers 12 of internal combustion engine 10 are in operation in section I. Throttle valves 26 and 28 are set in such a way that an air charge rI is in the range of optimum air charge $rI_1$. An ignition angle ZW (FIG. 3) is in the range of optimum ignition angle $ZW_1$. A torque M has a value M1.

During section I of the switchover phase, the instantaneous operating situation of internal combustion engine 10 is analyzed and a decision is made in the present case to interrupt the fuel injection into first subset 14 of combustion chambers 12 via injectors 30 at a point in time t2. Well before point in time t2, second section II of the switchover phase starts at a point in time t1 in that a setpoint value for an air charge rI is abruptly raised at point in time t1 (dashed curve in FIG. 2). In addition, starting at point in time t1, fuel is injected into combustion chambers 12 of first subset 14 and second subset 16 by injectors 30 and 32 via multiple injections, e.g., a double injection, per work cycle. This is indicated in FIG. 2 by a time bar having reference numeral 50. Prior to point in time t1, fuel is injected into combustion chamber 12 of internal combustion engine 10 by a single injection.

Throttle valves 26 and 28 are opened in a controlled manner due to the abrupt change in the setpoint value for air charge rI. However, due to the volume of intake manifold 22, the actual value of air charge rI (solid curve in FIG. 2) follows the abrupt rise of the setpoint value only gradually. Corresponding to the gradual change of the actual value of air charge rI in combustion chambers 12, ignition angle ZW, as is apparent from FIG. 3, is gradually changed toward "retard" from an optimum value $ZW_1$ to a value $ZW_2$ during section II of the switchover phase in such a way that torque M, provided by internal combustion engine 10, does not change and remains essentially constant at a value M1. In this way, a "torque reserve" is built up during section II of the switchover phase.

If fuel injection into first subset 14 of combustion chambers 12 via injectors 30 is abruptly interrupted at point in time t2, ignition angle ZW is abruptly advanced from retarded value $ZW_2$ reached up to this point to optimum value $ZW_1$. In this way, the torque which is generated by the combustion in second subset 16 of combustion chambers 12 is abruptly increased, thereby compensating for the torque drop due to the interruption of the injection into first subset 14 of combustion chambers 12, so that, at point in time t2 as well, the torque provided by internal combustion engine 10 remains constant at value M1. The third section of the switchover phase starts at point in time t2 at which internal combustion engine 10 is already running in half-engine operation. Shortly after the start of third section III, at a point in time t3, double injection 50 is terminated.

If a switchover is to be made from half-engine operation back again to full-engine operation, it is executed according to FIGS. 5 through 7: the corresponding switchover phase, in which a switchover is made from half-engine operation to full-engine operation, can also be subdivided into three sections IV, V, and VI. The decision is made in first section IV that the fuel injection into first subset 14 of combustion chambers 12 via injectors 30 is to be resumed at a point in time t5. Depending on value M1 of torque M, it is established during section IV that, starting at a point in time t4 which is shortly before point in time t5, the fuel is to reach combustion chambers 12, initially of second subset 16, and then also of first subset 14, via injectors 32 (and starting at point in time t5 also via injectors 30) via multiple injections, e.g., a double injection, per work cycle (time bar 52 in FIG. 5). Prior to point in time t4, the internal combustion engine runs in half-engine operation with a single injection of fuel into second subset 16 of combustion chambers 12 via injectors 32.

At switchover point in time t5, at which fuel is again injected into first subset 14 of combustion chambers 12, the setpoint value for air charge rI is abruptly lowered (dashed curve in FIG. 5). In addition, ignition angle ZW is abruptly decreased from optimum value $ZW_1$ to a value $ZW_2$ at point in time t5, thereby compensating for the additional torque which is generated by the combustion in first subset 14 of combustion chambers 12 starting at point in time t5.

Due to the air volume in intake manifolds 22 and 24, the actual value (solid curve in FIG. 5) responds to the abrupt change of the setpoint value for air charge rI with a corresponding delay. As the actual value of air charge rI drops, ignition angle ZW is gradually advanced to its value $ZW_1$. Second section V of the switchover phase, starting at point in time t5, ends at a point in time t6 at which the actual value of air charge rI reaches the setpoint value and at which ignition angle ZW reaches optimum ignition angle $ZW_1$ again. Directly after the end of section V, double injection 52 is terminated at point in time t7.

At this point it should be noted that double injections 50 and 52 each include an injection during an intake stroke and an injection during a compression stroke of the same work cycle of respective combustion chambers 12. This makes it possible to stabilize the combustion in combustion chambers 12 when ignition angle ZW is retarded (value $ZW_2$). At the same time, the fuel mass in combustion chambers 12 in the form of a wall film is smaller than in the case of a single injection only during an intake stroke. This reduces the emissions during operation of internal combustion engine 10.

What is claimed is:

1. A method for operating an internal combustion engine having multiple combustion chambers, the method comprising:
   intermittently interrupting a supply of fuel into at least one subset of the combustion chambers; and
   directly injecting fuel into the combustion chambers during a switchover phase for one of interrupting and resuming the fuel injection into at least the subset of the combustion chambers at least intermittently via multiple injections;
   wherein, during multiple injections, at least one injection takes place during an intake stroke and another injection takes place during a compression stroke of the same work cycle.

2. The method according to claim 1, wherein one of a crankshaft angle and a point in time of a switchover from a single injection to multiple injections is at least indirectly a function of an instantaneous operating state of the internal combustion engine.

3. The method according to claim 2, wherein the instantaneous operating state is an instantaneous load.

4. A method for operating an internal combustion engine having multiple combustion chambers, the method comprising:
   intermittently interrupting a supply of fuel into at least one subset of the combustion chambers;
   directly injecting fuel into the combustion chambers during a switchover phase for one of interrupting and resuming the fuel injection into at least the subset of the combustion chambers at least intermittently via multiple injections;
   prior to a switchover for an interruption of the fuel injection into at least the subset of the combustion chambers, increasing an air charge and retarding an ignition angle; and
   at a start or during an increase of the air charge and an adjustment of an ignition angle, making a switchover from a single injection to multiple injections.

5. The method according to claim 4, further comprising terminating the multiple injections directly during or after the switchover.

6. A method for operating an internal combustion engine having multiple combustion chambers, the method comprising:
   intermittently interrupting a supply of fuel into at least one subset of the combustion chambers;
   directly injecting fuel into the combustion chambers during a switchover phase for one of interrupting and resuming the fuel injection into at least the subset of the combustion chambers at least intermittently via multiple injections; and
   during or directly prior to a switchover for a resumption of the fuel injection into at least the subset of the combustion chambers, making a switchover from a single injection to multiple injections.

7. The method according to claim 6, further comprising:
   after the switchover for a resumption of the fuel injection into at least the subset of the combustion chambers, lowering an air charge and canceling a retarding of an ignition angle; and
   making a switchover from multiple injections to a single injection at least at about an end of a reduction and a cancellation of the retarding.

8. A computer program embodied in a computer-readable medium containing instructions which when executed by a processor perform the following method for operating an internal combustion engine having multiple combustion chambers:
   intermittently interrupting a supply of fuel into at least one subset of the combustion chambers; and
   directly injecting fuel into the combustion chambers during a switchover phase for one of interrupting and resuming the fuel injection into at least the subset of the combustion chambers at least intermittently via multiple injections;
   wherein, during multiple injections, at least one injection takes place during an intake stroke and another injection takes place during a compression stroke of the same work cycle.

9. An electric storage medium for a control/regulating unit of an internal combustion engine having multiple combustion chambers, the storage medium storing a computer program containing instructions which when executed by a processor perform the following method for operating the engine:
   intermittently interrupting a supply of fuel into at least one subset of the combustion chambers; and
   directly injecting fuel into the combustion chambers during a switchover phase for one of interrupting and resuming the fuel injection into at least the subset of the combustion chambers at least intermittently via multiple injections;

wherein, during multiple injections, at least one injection takes place during an intake stroke and another injection takes place during a compression stroke of the same work cycle.

10. A control/regulating unit for an internal combustion engine having multiple combustion chambers, comprising:

an arrangement for intermittently interrupting a supply of fuel into at least one subset of the combustion chambers; and an arrangement for directly injecting fuel into the combustion chambers during a switchover phase for one of interrupting and resuming the fuel injection into at least the subset of the combustion chambers at least intermittently via multiple injections;

wherein, during multiple injections, at least one injection takes place during an intake stroke and another injection takes place during a compression stroke of the same work cycle.

* * * * *